(12) United States Patent
Wang (10) Patent No.: US 9,573,320 B2
(45) Date of Patent: Feb. 21, 2017

(54) APPARATUS AND METHODS FOR REPAIRING DISCREPANT WELDS USING A SPECIALLY-DESIGNED MECHANICAL INTERMEDIARY

(71) Applicant: Pei-Chung Wang, Troy, MI (US)

(72) Inventor: Pei-Chung Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 158 days.

(21) Appl. No.: 14/476,292

(22) Filed: Sep. 3, 2014

(65) Prior Publication Data

US 2015/0059958 A1  Mar. 5, 2015

Related U.S. Application Data

(60) Provisional application No. 61/873,454, filed on Sep. 4, 2013.

(51) Int. Cl.
  *B29C 65/30* (2006.01)
  *B29C 65/00* (2006.01)
  (Continued)

(52) U.S. Cl.
  CPC .......... *B29C 65/30* (2013.01); *B29C 35/0261* (2013.01); *B29C 65/08* (2013.01); *B29C 65/34* (2013.01); *B29C 65/348* (2013.01); *B29C 65/3476* (2013.01); *B29C 66/0342* (2013.01); *B29C 66/1122* (2013.01); *B29C 66/21* (2013.01); *B29C 66/41* (2013.01);
  (Continued)

(58) Field of Classification Search
  CPC ...... B29C 35/0261; B29C 65/30; B29C 65/34; B29C 65/35; B29C 65/562; B29C 65/564; B29C 66/974; B29C 73/06; B29C 73/08; B29C 73/10; B29C 73/34
  USPC ......... 156/64, 94, 73.1, 73.5, 73.6; 264/36.1
  See application file for complete search history.

(56) References Cited

U.S. PATENT DOCUMENTS

| 2010/0173123 | A1* | 7/2010 | Zardus | F16B 11/006 |
| | | | | 428/137 |
| 2013/0112664 | A1* | 5/2013 | Erlacher | B21J 15/147 |
| | | | | 219/78.01 |
| 2013/0248083 | A1* | 9/2013 | Takahashi | B21J 15/025 |
| | | | | 156/92 |

FOREIGN PATENT DOCUMENTS

JP   WO 2012077196 A1 *  6/2012  ............ B21J 15/025

* cited by examiner

*Primary Examiner* — George Koch
(74) *Attorney, Agent, or Firm* — Mickki D. Murray, Esq.; Parks IP Law LLC (57) ABSTRACT

A method, for repairing a discrepant weld in a workpiece arrangement including at least two workpieces, comprising positioning a mechanical intermediary adjacent the discrepant weld and inserting the intermediary through the discrepant weld and into at least a distal workpiece of the two workpieces, wherein upon insertion, a proximate surface of the intermediary is exposed at a proximate side of the workpiece arrangement. The method further includes delivering weld energy to the intermediary. The intermediary is configured, and the weld energy provided, so that energy passes through the intermediary in a pre-determined manner. Energy passing through the intermediary in the pre-determined manner generates heat in material of the workpieces causing the material to melt at an arrangement interface. The method further comprises allowing or causing the material
(Continued)

melted to cool, wherein the melted material, when cooled, forms and/or strengthens a robust joint connecting the workpieces.

11 Claims, 7 Drawing Sheets

(51) Int. Cl.
| | | |
|---|---|---|
| *B32B 43/00* | (2006.01) | |
| *B29C 65/08* | (2006.01) | |
| *B29C 65/34* | (2006.01) | |
| *B29C 73/06* | (2006.01) | |
| *B29C 73/08* | (2006.01) | |
| *B29C 73/34* | (2006.01) | |
| *B29C 35/02* | (2006.01) | |
| *B29K 101/12* | (2006.01) | |
| *B29K 105/00* | (2006.01) | |
| *B29L 31/30* | (2006.01) | |
| *B29C 65/56* | (2006.01) | |
| *B29C 65/78* | (2006.01) | |

(52) U.S. Cl.
CPC ...... *B29C 66/7392* (2013.01); *B29C 66/8322* (2013.01); *B29C 73/06* (2013.01); *B29C 73/08* (2013.01); *B29C 73/34* (2013.01); *B32B 43/00* (2013.01); *B29C 65/3468* (2013.01); *B29C 65/562* (2013.01); *B29C 65/7855* (2013.01); *B29C 66/45* (2013.01); *B29C 66/7212* (2013.01); *B29C 66/742* (2013.01); *B29C 66/7422* (2013.01); *B29C 66/74283* (2013.01); *B29C 66/8242* (2013.01); *B29C 66/8246* (2013.01); *B29C 66/974* (2013.01); *B29K 2101/12* (2013.01); *B29K 2105/253* (2013.01); *B29L 2031/30* (2013.01); *B32B 2310/021* (2013.01); *B32B 2398/20* (2013.01); *B32B 2605/00* (2013.01)

APPARATUS AND METHODS FOR REPAIRING DISCREPANT WELDS USING A SPECIALLY-DESIGNED MECHANICAL INTERMEDIARY

TECHNICAL FIELD

The present disclosure relates generally to joining workpieces robustly and, more particularly, to apparatus and methods for repairing, using a specially-configured mechanical intermediary, flawed or discrepant welds in workpiece arrangements including at least two workpieces, wherein at least one each set of workpieces includes a polymeric composite.

BACKGROUND

In automotive manufacturing, polymeric composites are being used increasingly due to favorable characteristics including being lightweight, highly-conformable or shapeable, strong, and durable. Some composites are further colorable and can be finished to have most any desired texture or finish.

Increased use in automobiles includes, for instance, in instrument and door panels, lamps, air ducts, steering wheels, upholstery, truck beds or other vehicle storage compartments, upholstery, external parts, and even engine components. Regarding engine components, and other under-the-hood (or, UTH) applications, for instance, polymers are configured, and being developed continuously, that can withstand environments being hot and/or chemically-aggressive.

Regarding external parts, such as fenders, polymers are being developed to have online paintability and high heat and chemical resistance over longer periods of time.

Many other potential uses for polymers and, particularly polymeric composites, in automotive applications continue to be developed.

With this trend, finding ways to efficiently and effectively join polymer components is becoming progressively important. Compression molding and post-mold joining techniques—e.g., ultrasonic welding—are being used more commonly, for instance.

Figures 1, 2:
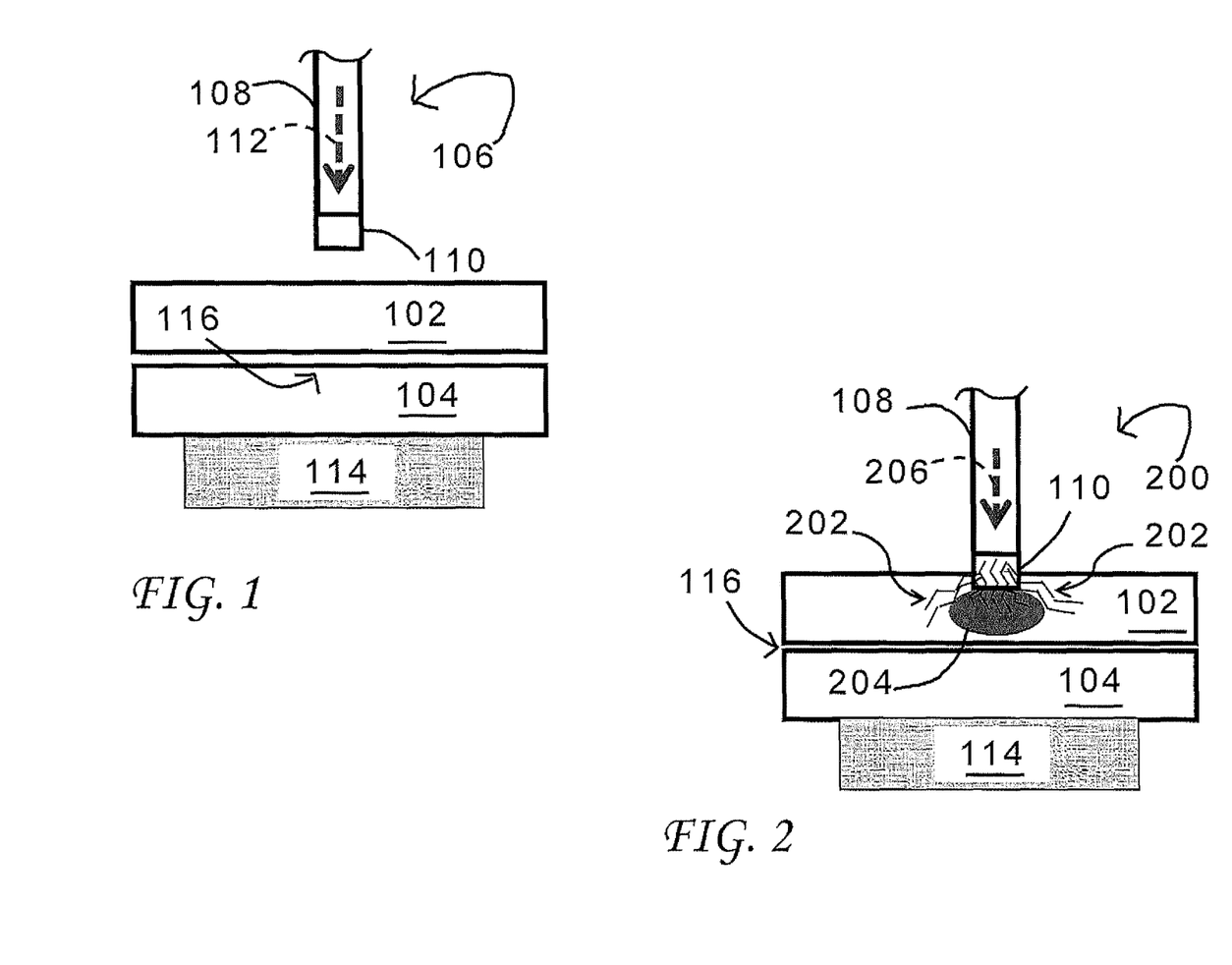
FIG. 1 illustrates schematically aspects of a conventional ultrasonic welding arrangement including a welding horn and two workpieces prior to ultrasonic welding.
FIG. 2 shows the arrangement of FIG. 1 as welding is commenced to join the workpieces together.

In ultrasonic welding, two workpieces are joined, wherein one or both includes a polymeric composite or other polymer. With reference to the figures, and more particularly the first figure, FIG. 1 shows schematically a conventional ultrasonic welding arrangement for joining two workpieces 102, 104 using a welding tool 106.

The tool 106 includes multiple parts, such as an arm 108 and an ultrasonic vibration applicator, or horn 110. The arm 108 is connected to other components, such as a pneumatic or servo actuator (not shown in detail) for controlling vertical displacement of the horn 110.

For welding, components of the tooling 106 are moved to a proximate workpiece 102 of the two workpieces as indicated by arrow 112.

For the ultrasound technique, the workpieces 102, 104 are held together between the horn 110 and an under structure 114, such as an anvil. The pieces 102, 104 are maintained under pressure while ultrasonic vibrations are applied to pieces for the welding.

The vibrations create frictional heat, initially at faying interfaces (i.e., tool-to-workpiece, workpiece-to-workpiece), and then intermocular friction in the composite material, causing the material to melt. When the melting occurs at the interface 116, the workpieces are joined there by molecular bonds (e.g., fusion or covalent bonds) of the molten material.

Sometimes, flawed, or discrepant welds are formed. A discrepant weld, generally, is any weld differing undesirably from a target weld configuration. A common flaw is that a weld is undersized, or otherwise less robust than desired. In one scenario, a discrepant weld can, for instance, not reach the inter-piece interface 116 as needed for joining the workpieces 102, 104 together robustly.

In another scenario, a discrepant weld reaches the inter-part interface 116, but does not bridge the interface 116 as needed for joining the 102, 104 workpieces together robustly.

Figure 3:
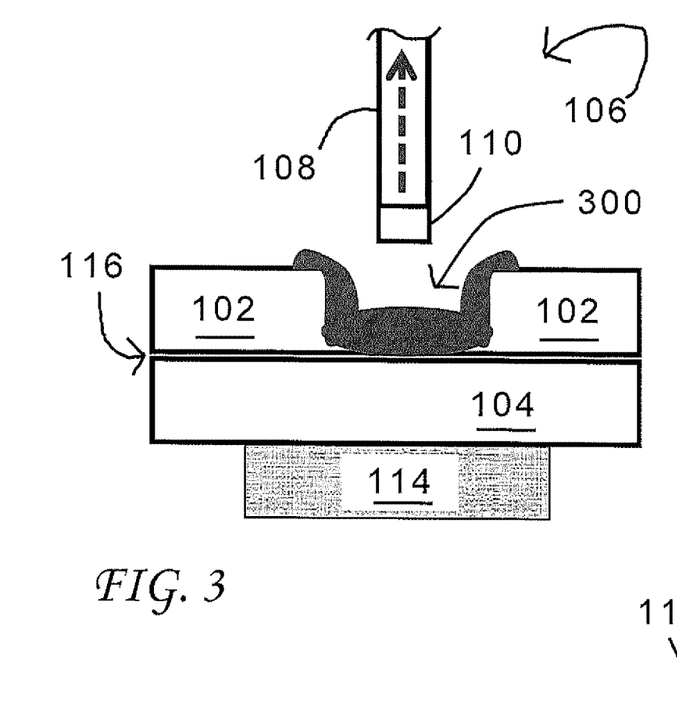
FIG. 3 shows the arrangement as welding is completed, yielding a discrepant weld—e.g., undersized and/or shaped in a non-robust manner.

In the example of FIG. 3, the weld 202 barely reaches the interface 116, and does not connect robustly to the distal workpiece 104.

FIG. 2 shows a subsequent stage 200 of the arrangement wherein the horn 110 provides welding energy 202—e.g., high-frequency (HF) acoustic vibrations—to the workpieces 102, 104. As with the downward force 112 indicated in FIG. 1, a downward force 206 may be applied in connection with the operation of FIG. 2. A molten workpiece material nugget 204 begins to form, in response to the heating adjacent the horn 110, as the vibration is transmitted from the horn into the workpiece 102.

FIG. 3 shows the arrangement, after the erred welding in which the insufficient, or discrepant, weld 300 is formed. There are many factors that can contribute to the weld 300 being insufficient. For instance, workpiece material may be contaminated, one or both of the workpieces may be overly-thick, one or both workpieces may be improperly positioned or not held robustly and so moving (due, e.g., to improper or malfunctioning fixture), improper process variables [e.g., frequency, amplitude, clamping force, or time (e.g., insufficient time)], and/or other conditions may be present.

FIG. 3 shows the weld horn 106 being withdrawn from the newly completed, but insufficient, weld 300.

Figure 4:
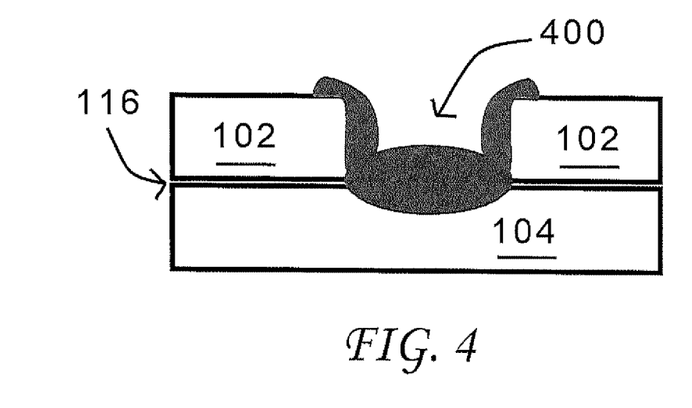
FIG. 4 shows the arrangement of FIG. 1 after an example preferred welding, resulting in a complete weld.

FIG. 4 shows an example sufficient, desired, weld 400. The weld 400 bridges the inter-piece gap 116 significantly, joining the pieces 102, 104 robustly.

With continued reference to the discrepant weld 300 (FIG. 3), an attempt to simply re-weld the weld 300, using the same tooling and process, would be ineffective at least because sufficient frictional heat will likely not be able to be generated again at the same faying interfaces of the workpiece, as modified, for re-welding. More particularly, the workpiece structure, especially at a surface or perimeter of the previously-welded zone, would have become too constraint to generate sufficient welding heat again.

Attempting to repair a weld 300 by adding additional welds around it is also usually not practical due to limited space, material, time, and energy, as well as for cosmetic considerations.

A surely undesirable alternative is to scrap the workpieces 102, 104 in which the discrepant weld 300 is formed.

Hypothetically, some workpieces improperly joined could be recycled, somehow, but resources would need to be dedicated to determining whether parts can be recycled, recycling the parts that can be, and handling the parts that cannot.

Yet another alternative is conventional mechanical fastening of the workpieces 102, 104 together instead of welding, or after a partial weld has been identified. The workpieces can be screwed together, or connected by nuts and bolts, for instance. These connections have shortcomings including possible lack of durability and mechanical strength. The connection may not be robust due to the fastener connecting to already insufficient joint material. Another shortcoming is that the fastener may need to be threaded in order to maintain connection to the workpiece material over time, and the threading may be insufficient for connecting to some materials, such as metal or polymeric composites.

SUMMARY

The present technology relates to apparatus and methods for repairing flawed or discrepant welds created in a workpiece arrangement including two workpieces. The workpieces can include, e.g., a polymeric composite. Other example materials are described below.

In a primary implementation, the repairing technique increases a size and/or robustness (e.g., strength) of an existing insufficient weld.

The repair process includes positioning a specially-designed mechanical intermediary component to extend between the workpieces 102, 104, for receiving subsequent welding energy in a repair welding repair routine.

The repair routine may be based on resistance-heating (e.g., Joule heating) generated by electrical current as the welding energy. The electrical current is applied via two or more electrodes, as described further below.

Benefits of the present technology include saving energy and cost associated with conventional efforts such as scrapping flawed products or adding new welds. Average cycle time, over repeated iterations of welding, such as in a manufacturing plant environment, is also reduced by avoiding such efforts.

The resulting product is more robust, having a stronger joint connecting the workpieces.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term application, or variants thereof, is used expansively herein to include routines, program modules, programs, components, data structures, algorithms, and the like.

Applications can be implemented on various system configurations, including single-processor or multiprocessor systems, microprocessor-based electronics, combinations thereof, and the like. In certain embodiments, some or all operations (e.g., controlling horn application) are performed by, or at least initiated by a computing device, such as a processor executing computer-executable instructions stored or included at a computer-readable medium. And any one or more steps of the process can be performed, initiated, or otherwise facilitated by automated machinery, such as robotics.

I. General Overview of the Disclosure

An apparatus and methods for repairing flawed or discrepant welds, such an insufficient ultrasonic weld, created between workpieces are described. In one embodiment, at least one of the workpieces, e.g., a top, proximate, one of the workpieces, includes a polymer, such as a polymeric composite. Below, other example polymer-based materials, and other possible workpiece materials are described.

In situations in which a discrepant (e.g., insufficient) weld is formed, the repairing technique operates to, using a specially-designed and configured mechanical intermediary, increase the size, fusion, and/or robustness of the discrepant weld, and provide a peel-stop back-up connection.

In operation, the specially-configured mechanical intermediary is positioned in the part having the discrepant weld so that the intermediary extends between both workpieces and is exposed at opposing locations to a surface of the workpiece arrangement. Resistive-welding electrodes are positioned subsequently so that each electrode contacts one of the exposed portions of the specially-configured mechanical intermediary.

Welding energy in the form of electrical current is passed between the electrodes, through conductive parts of the specially-configured mechanical intermediary, creating new molten material by resistive (e.g., Joule) heating, initially at interfaces between the specially-configured mechanical intermediary and the workpieces. In one embodiment, the intermediary includes insulative material surrounded by the conductive material, causing the current to focus at exterior portions of the intermediary for promoting the resistive heating efficiently adjacent the surfaces of the exterior portions.

After the secondary welding, the specially-configured mechanical intermediary is locked robustly in place by hardening new molten workpiece material formed by the resistance welding. The hardening new material also creates a robust weld with, and distinct from, the intermediary.

As also provided, specially-configured mechanical intermediary also acts as a peel stopper after the joining process, during use of the resulting product. The intermediary, in this function, provides an extra layer of protection against either of the workpieces moving (e.g., peeling) away from the other of the workpieces.

The resulting product, including the new weld material, and specially-configured mechanical intermediary, creates a connection between the workpieces that is much more robust than the original, discrepant weld.

By the present technology, material is saved and cost reduced. Material and cost are reduced by, e.g., obviating conventional efforts such as scrapping or recycling flawed products, or adding new welds.

The system components, algorithm, and operations are described further below with reference to the figures.

II. Process, Tooling, and Workpieces—FIGS. 5-13

The present technology is now described with reference to example systems, tooling, and workpieces. The figures are referenced to facilitate understanding of the technology and not to limit scope thereof.

Reference to directions herein, such as upper, lower, up, down, and lateral, are provided to facilitate description of the present technology but does not limit scope of the technology. A description in which the horn is described as descending down upon a proximate workpiece is not limited, for example, to the horn moving vertically downward in the earth, or environment, frame. The horn in this case can be moving from left to right, for example, in the environment frame.

Figure 5:
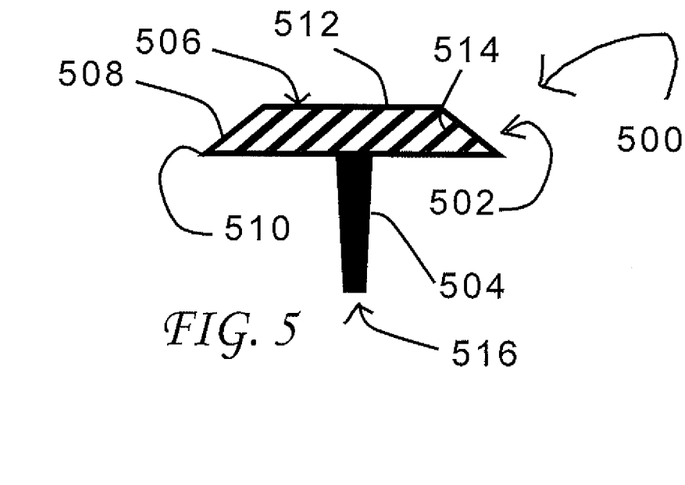
FIG. 5 illustrates schematically a cross-sectional view of a novel weld-repair tool, including a specially-configured mechanical intermediary, for guiding welding energy (e.g., electrical current) in a secondary welding routine.

Turning again to the figures, and more particularly, to the fifth figure, FIG. 5 shows a custom weld-repair tool 500 according to the present technology.

The repair tool 500 is a specially-configured mechanical intermediary. The intermediary 500 is used in response to determining that a discrepant weld is present. The determination can be made in any appropriate manner. In one embodiment, the determination is made using teachings of one or both of U.S. Pat. No. 8,439,247 and U.S. Pat. Appl. Publ. No. 2011/0108181, which are incorporated herein by reference.

Because determining existence of a discrepant weld can be made during and/or immediately following discrepant-weld formation, the repair process can be commenced immediately thereafter, without need to relocate the workpieces 102, 104.

The arrangement is in one embodiment configured so that the specially-configured mechanical intermediary 500 is positioned and/or inserted into a final position manually, such as by assembly-plant personnel. In one embodiment, one or both acts are positioned by automated machinery—e.g., robotics. In one embodiment one or both acts are performed by both, person and machinery, and in one embodiment by either, selectively.

With continued reference to FIG. 5, the specially-configured mechanical intermediary 500 includes an upper, head portion, or head 502 and a lower, protruding, portion 504.

The head 502 has a first, top, or proximate contact surface 506. In the resistive-welding routine referenced above, an electrode will contact this surface 506.

The head 502 can have any of a wide variety of shapes and sizes. In the example shown, the head 502 has a generally round, or circular, top profile, as can be seen in the top plan view of the intermediary 500 in FIG. 6. Other example profile shapes include oval, elliptical, square, or other rectangle, or other shapes having one or more straight sides.

Figure 6:
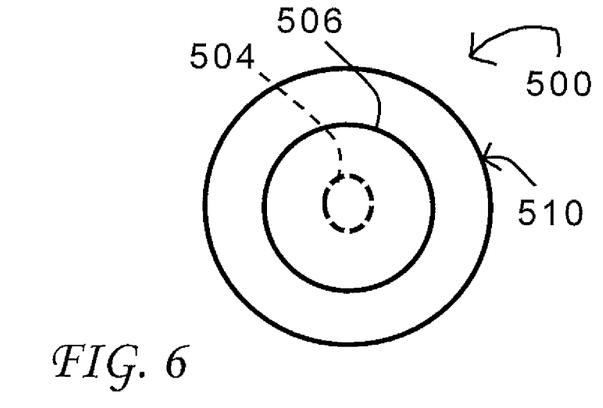
FIG. 6 shows a top plan view of the specially-configured mechanical intermediary of FIG. 5.

It is contemplated that various specially-configured mechanical intermediaries can be sized and shaped to match shapes of various common types of discrepant welds. Personnel or machinery can select from amongst the options, accordingly. For instance, when an exposed orifice to a discrepant weld is generally round, then a generally circular specially-configured mechanical intermediary 500, such as that in FIG. 6, is selected for the case. When an exposed orifice to a discrepant weld is generally oval, then a generally oval specially-configured mechanical intermediary 500 is selected for the case. And so on. As noted, the selection could be made manually, e.g., by assembly-plant personnel, and/or by automated machinery—e.g., robotics.

In the illustrated embodiment, the head 502 includes an angled side 508 extending to an edge 510 of the head 502. With the angled side being as shown, a width of the head 502 increases from a top (e.g., at the first contact surface 506) of the head 502 toward a bottom of the head 502 (e.g., adjacent the edge 510). In one embodiment, the side 508 is angled in an opposite direction than that shown—i.e., the head width decreases from the top of the head toward the bottom of the head.

In one embodiment, the head 502 is a composite, such a by having a conductive shell 512, or coating (e.g., an electrically-conductive shell) surrounding a generally insulative interior 514 (e.g., electrically-insulative interior), as shown in FIG. 5. Example electrically-conductive materials include any of various metals (aluminum, steel, brass, copper, etc.). Example electrically-insulative materials include rubber and plastic. In some embodiments, the head 502 is a solid or homogonous conductor.

The protrusion 504 also includes conductive material 512. The protrusion 504 includes a conductor (e.g., electric and/or thermal conductor). Generally, the material of the protrusion 504 should be strong enough to pierce through the material of the workpieces 102, 104 in their hardened states (e.g., never melted, or melted and cooled and hardened).

In a contemplated embodiment (not shown in detail), the protrusion 504 is a composite, including external conductive material (or, 'shell' or 'coating') surrounding internal insulative material (e.g., an electrically-conductive shell or coating). Again, directing the electricity to the areas needed, the composite format, here regarding the protrusion 504, may save time and energy in the repair process.

The composite format, i.e., conductive-insulative configuration, is designed to direct transmission of weld energy—e.g., electric current—through the intermediary 500 as desired. Generally, the transmission is directed to portions of the specially-configured mechanical intermediary 500 adjacent intermediary external surfaces so that the weld energy—e.g., electric current—effects heat generation (from, e.g., Joule heating) in the material of the workpieces 102, 104 adjacent the intermediary 500, for curing the discrepant weld 300. These characteristics and operations are described further below in connection with the resistance-welding routine.

By directing the electricity to the areas needed, the composite form may save time and energy in the repair process. The solid, or homogenous, forms may be less expensive.

The lower, protruding portion 504 of the specially-configured mechanical intermediary 500 can also have various sizes and shapes within the scope of the present technology, and, like the head 502, is not limited to the size and shape illustrated. In one embodiment, the specially-configured mechanical intermediary 500 is sized and shaped so that, when the intermediary is inserted fully into a discrepant weld 300, the top surface 506 is exposed at a proximate side of the workpieces 102, 104, and a tip 516 of the protrusion 504 is exposed at a distal side of the workpieces.

A sufficient height of the portion 504 is needed in this implementation. A width, as with all aspects of the tool 500, need be appropriate to transmit the welding energy—e.g., electrical current—as needed during a secondary welding routine.

In one embodiment, the protrusion 504 is sized and shaped to facilitate insertion of the tool 500 through the discrepant weld 300 and into the distal workpiece 104, and to handle the secondary welding energy as desired. The handling can include, e.g., transferring electrical current received from the head 502 to the distal electrode 104 via the tip 516, or transferring electrical current received from the distal electrode via the tip 516 to the head 502, and therein causing workpiece material adjacent the protrusion 504 to heat (e.g., by Joule heating) and melt.

As shown in the figures, the protrusion 504 can include a tapered portion—i.e., a portion having width that tapers from, e.g., wider closer to the head 502 to thinner toward the tip 516. In one embodiment, the tip 516 is pointed. In a contemplate embodiment, the tool 500 includes more than one protrusion for extending through the discrepant weld 300 and into at least the distal workpiece 104.

Figure 8:
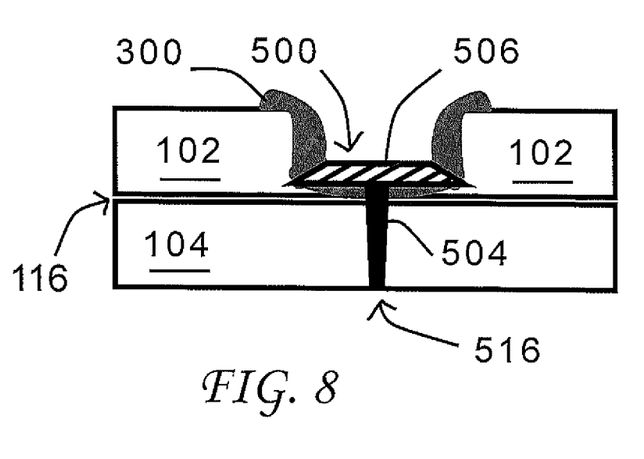
FIG. 8 shows the arrangement after the specially-configured mechanical intermediary has been placed in its secondary-welding position.

An example shaping, sizing, and positioning for the tool 500 is shown in FIG. 8, for instance.

Figure 7:
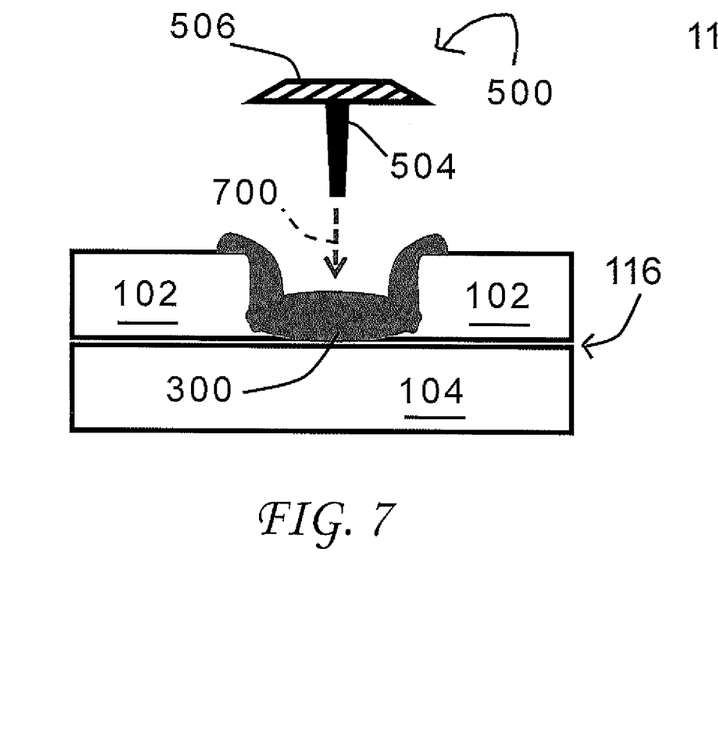
FIG. 7 shows the arrangement of FIG. 3, including the discrepant weld, and the specially-configured mechanical intermediary being moved toward a final, secondary-welding, position with respect to the discrepant weld and the workpieces.

FIG. 7 shows schematically the custom weld-repair tool 500 being lowered, as indicated by arrow 700, toward the proximate workpiece 102 of the workpieces 102, 104 joined by the discrepant weld 300.

The workpieces 102, 104 welded together can be similar or dissimilar. One or both pieces include a polymer, such as in the form of a polymeric composite, for instance. Example workpiece materials are described in greater detail further below.

As described above, the tool 500 in one embodiments is sized and shaped to match, generally (exact shape match not required), a shape of the discrepant weld 300. For instance, if the discrepant weld is generally round, then the generally circular intermediary 500 shown in FIG. 2 is selected.

Positioning the specially-configured mechanical intermediary 500 as needed for subsequent welding (e.g., resistive welding) includes positioning the intermediary 500 so that it extends from top to bottom of the workpieces. A portion should be exposed at a top, and a portion should be exposed at a bottom, of the arrangement. The top surface 506 of the tool will be exposed at the proximate (e.g., top) side of the arrangement and a tip 516 of the protrusion 504 of the tool 500 will be exposed at the distal side of the arrangement. The tool 500, including the protrusion and the head, are sized and shaped to accomplish this.

In a contemplated embodiment, assuming that sufficient energy (e.g., electrical current) is used in the secondary welding (e.g., resistive welding) welding routine, and depending on the distal workpiece 104 material, the tip 516 need not extend fully to the lower surface of the distal workpiece 104—i.e., the tip 516 in this case need not be physically, or visibly, exposed—so long as the electrical current can still pass to, or from, the corresponding electrode 904.

Positioning the specially-configured mechanical intermediary 500 includes forcing the protruding portion 504 of the intermediary to pierce at least the discrepant weld 300 and the distal workpiece 104. If the discrepant weld 300 does not reach from a top, exposed surface all the way to the interface 116 in a robust manner, positioning the intermediary 500 may include pushing the intermediary past material of the proximate workpiece 102.

As mentioned, the force for pushing the intermediary 500 into the workpiece arrangement can be provided by personnel or by automated machinery, such as using a hard rubber mallet.

FIG. 8 shows a positioning of the intermediary 500 in the workpiece arrangement.

Figure 9:
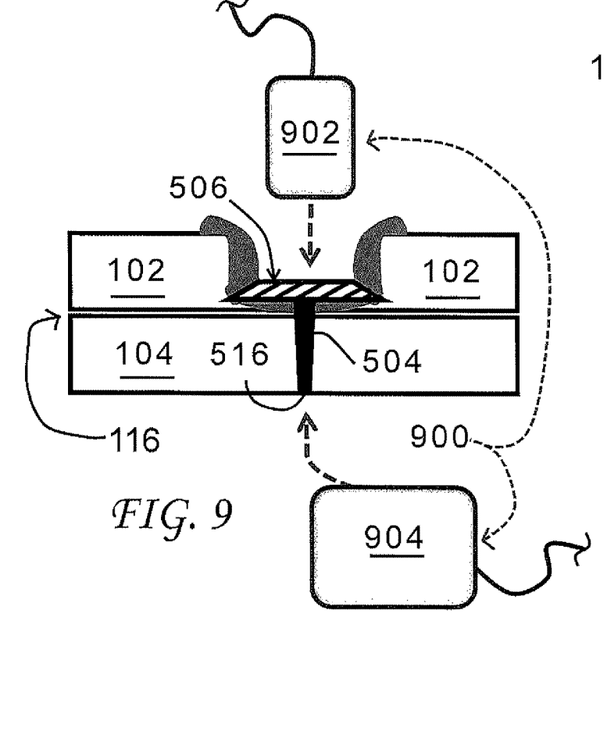
FIG. 9 shows introduction of resistance-welding electrodes so that each electrode contacts a portion of the specially-configured mechanical intermediary.

With the specially-configured mechanical intermediary 500 positioned in the workpiece arrangement as provided, a secondary welding-energy applicator or device 900 is introduced, as shown by way of example in FIG. 9. The secondary welding-energy device 900 in some embodiments includes two electrodes 902, 904. While the secondary welding-energy device 900 includes two components, in some embodiments, the secondary welding-energy device 900 includes one, or more than two components.

The electrodes 902, 904 are configured and arranged (e.g., connected to a source and a ground) to provide electrical current between them 902, 904 (the current is not visualized in the figures). The electrical current is provided for secondary welding—e.g., resistive welding—together of the workpieces 102, 104 using the intermediary 500.

While resistive welding is described primarily herein as the secondary welding technique, it is contemplated as provided that other techniques (e.g., heating via introduced conductor tool) can be used for the secondary welding without departing from the scope of the present technology.

Figure 10:
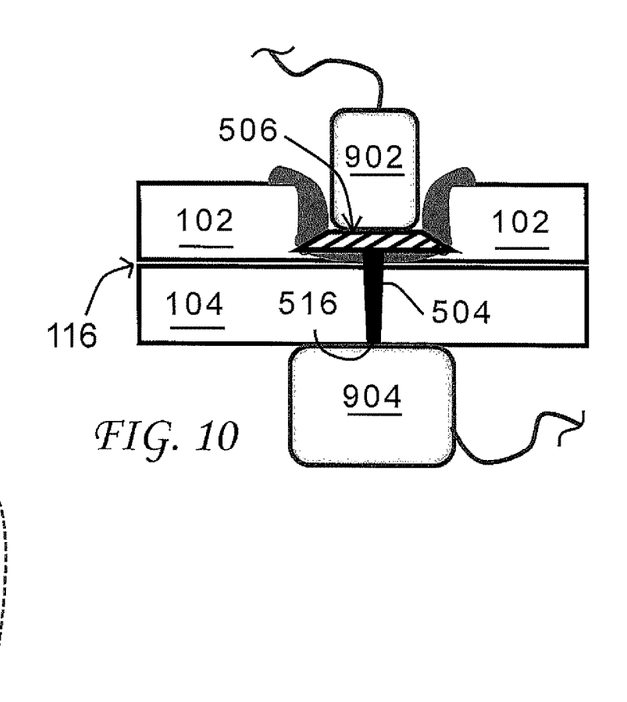
FIG. 10 shows the arrangement following the positioning of FIG. 9.

FIG. 10 shows the electrodes 902, 904 positioned for the secondary welding. As provided, the specially-configured mechanical intermediary 500 is positioned in the part having the discrepant weld so that the intermediary 500 extends between both workpieces and is exposed at opposing locations to a surface of the workpiece arrangement.

As also shown in FIG. 10, the resistive-welding electrodes 902 904 are positioned so that each electrode contacts one of the exposed portions of the specially-configured mechanical intermediary 500—i.e., proximate surface 506 and distal tip 516.

More particularly, the proximate electrode 902 of the secondary-welding device 900 is positioned adjacent and in contact with the proximate surface 506 of the mechanical intermediary 500, as shown in FIG. 10. The distal electrode 904 of the secondary-welding device 900 is positioned adjacent and in contact with a distal portion, e.g., tip 516, of the mechanical intermediary 500, as also shown in FIG. 10.

With the secondary-welding device 900 in position, the secondary welding is commenced. In the primary example context, in which the secondary technique involves resistive welding, the operation involves beginning to deliver electrical current between the electrodes 902, 904.

The system can be arranged so that the electrical current is passed from the first, or proximate, electrode 902 and through the mechanical intermediary tool 500 piercing the discrepant weld and workpieces 102, 104, on its way to the second, or distal, electrode 904. Or the system can be arranged so that the electrical current is passed to the first, or proximate, electrode 902, via the mechanical intermediary 500 piercing the discrepant weld and workpieces 102, 104, from the second, or distal, electrode 904.

The electrical current passing between the electrodes 902, 904, through conductive parts of the specially-configured mechanical intermediary 500, causes, by resistive heating, melting of workpiece material adjacent the intermediary 500. The resistive heating, and so the melting, generally occurs first at interfaces between the conductive portions 512, 504 and material of one or both workpieces.

While the secondary, repair, welding routine may include melting of the workpiece material that was previously melted, in the original welding (e.g., initial, ultrasonic welding of FIG. 2), and subsequently cooled to some extent, it is expected that usually resistive heating and melting in the repair welding routine will occur predominantly in workpiece material that was not properly melted in the initial welding. Newly-melted workpiece material can also marry with any initially-melted material that is still at least partially molten or that is re-melted in the secondary welding routine.

Figure 11:
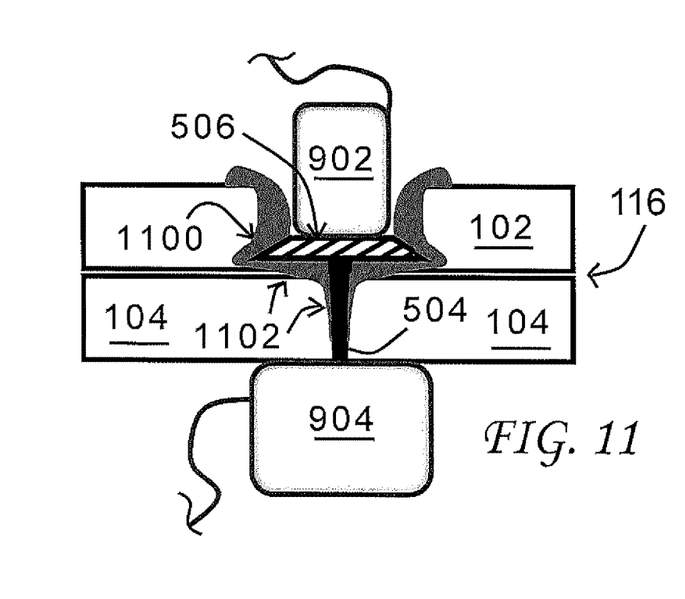
FIG. 11 shows initial activity in the arrangement as welding energy in the form of electrical current is passed between the electrodes, through conductive parts of the specially-configured mechanical intermediary, creating new molten material by resistive (e.g., Joule) heating, initially at interfaces between the specially-configured mechanical intermediary and the workpieces.

FIG. 11 shows an example early stage of the secondary welding. As can be seen comparing FIG. 11 against FIGS. 7-10, new molten material 1100, 1102 is being formed in this stage. The new molten material 1100, 1102 is formed, e.g., in part or completely, adjacent the shaft 504 and about the head 502. Importantly, some of the new molten material 1102 is being formed at the interface 116, and so joining, or further joining, the workpieces 102, 104.

Figure 12:
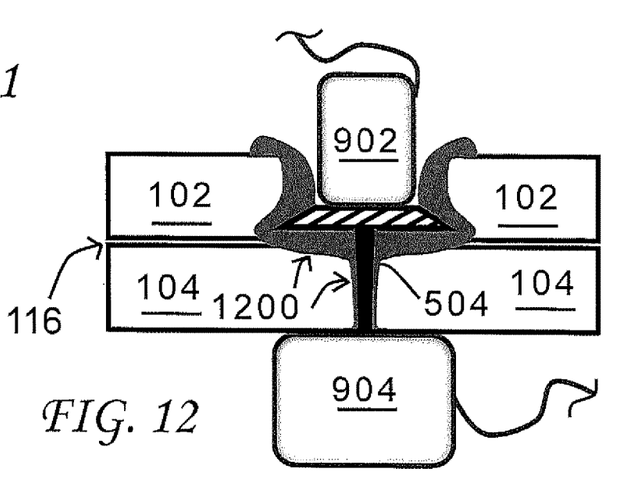
FIG. 12 shows the arrangement of FIG. 11 following further application of the electrical current in completing the repairing resistive welding routine.

FIG. 12 shows an example subsequent stage of the secondary, repair, welding routine. As can be seen comparing FIG. 12 with FIG. 1, more molten material 1200 has been formed. The melting continues to be focused adjacent the shaft 504 and about the head 502. Melted material continues to form at the interface 116, and so joining, or further joining, the workpieces 102, 104.

When sufficient melting is accomplished, the secondary, repair, welding routine is complete. The secondary-welding device 900 is withdrawn from the repaired part 1300 as shown by arrows in FIG. 13.

In one embodiment, a set amount of energy, or time, corresponding to sufficient secondary welding is pre-determined, such as in laboratory testing. In this case, the secondary, repair, welding can be performed until the target energy level or time is reached. For instance, it may be determined that one second of secondary welding by electrical current is generally sufficient to repair the weld 300, and so the secondary welding is performed for this amount of time.

With the secondary, repair, welding complete, the specially-configured mechanical intermediary 500 is secured, or locked, robustly in place by the hardening new molten workpiece material (e.g., 1100, 1102, 1200) formed by the secondary welding. The hardening new material creates a robust weld with the intermediary 500.

As noted, the specially-configured mechanical intermediary 500 can act as a peel stopper after the joining process. The tool 500 in this function, being secured in the workpiece arranged by the secondary welding process (as shown in, e.g., FIGS. 7-13), provides an extra layer of protection against either of the workpieces 102, 104 moving (e.g., peeling) away from the other of the workpieces 104, 102.

The resulting part 1300, including the new joint 1302 (robust weld material 1304 and specially-configured mechanical intermediary 500), creates a connection between workpieces that is much more robust than the original, discrepant weld.

The nature of the workpieces, referenced above, is described now in further detail.

The workpieces 102, 104 being welded together can be similar or dissimilar, as mentioned. Regarding dissimilar workpiece materials, one workpiece can be a plastic or other polymer, for instance, and the other can be steel, aluminum, an alloy, or other metal, etc. Thus, the teachings of the present disclosure can be used to join a polymer (e.g., polymeric composite) to another polymer, or to join a polymer to a metal, for instance.

In one embodiment, the material of the pieces 102, 104 includes polyethylene. In one embodiment, the material includes polyethylene terephthalate (PET), high density polyethylene (HDPE) and/or ethylene vinyl alcohol (EVOH).

In one embodiment, at least one of the workpieces 102, 104 being joined includes a polymer. At least one of the workpieces 102, 104 can include synthetic, or inorganic, molecules. While use of so-called biopolymers (or, green polymers) is increasing, petroleum based polymers are still much more common.

Material of one or both workpieces 102, 104 may also include recycled material, such as a polybutylene terephthalate (PBT) polymer, which is about eighty-five percent post-consumer polyethylene terephthalate (PET).

In one embodiment one or both of the workpieces 102, 104 includes some sort of plastic. In one embodiment, the material includes a thermo-plastic.

In one embodiment one or both of the workpieces 102, 104 includes a composite. For example, in one embodiment one or both of the workpieces includes a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite.

The material 102, 104 in some implementations includes a polyamide-grade polymer, which can be referred to generally as a polyamide.

Material of one or both workpieces 102, 104 may also include includes polyvinyl chloride (PVC).

In one embodiment, the material 102, 104 includes acrylonitrile-butadiene-styrene (ABS).

In one embodiment, the material 102, 104 includes a polycarbonate (PC).

Material of one or both workpieces 102, 104 may also comprise a type of resin. Example resins include a fiberglass polypropylene (PP) resin, a PC/PBT resin, and a PC/ABS resin.

The workpieces 102, 104 may be pre-processed, such as heated and compression molded prior to the welding.

As mentioned, and any of the operations can be performed, initiated, or otherwise facilitated by automated machinery, such as robotics. A robot (not shown in detail) can be configured and arranged (e.g., connected to the custom weld-repair tool 500) to control the lowering and/or insertion of the weld-repair 500. The robot can be automated or controlled by automation embodied in, e.g., a computer or other electronic controller (not shown).

The controller, in one embodiment, includes a tangible computer readable storage device, or memory. The memory is programmed with (i.e., stores) computer-executable instructions, or code, that, when executed by a processor, such as a processor of the controller, causes the processor to initiate and control motion of the weld-repair tool 500.

The controller can control a downward movement of the tool 500, a total distance, or displacement, of the movement, and a velocity, or rate of displacement and direction (e.g., down or up).

Figure 13:
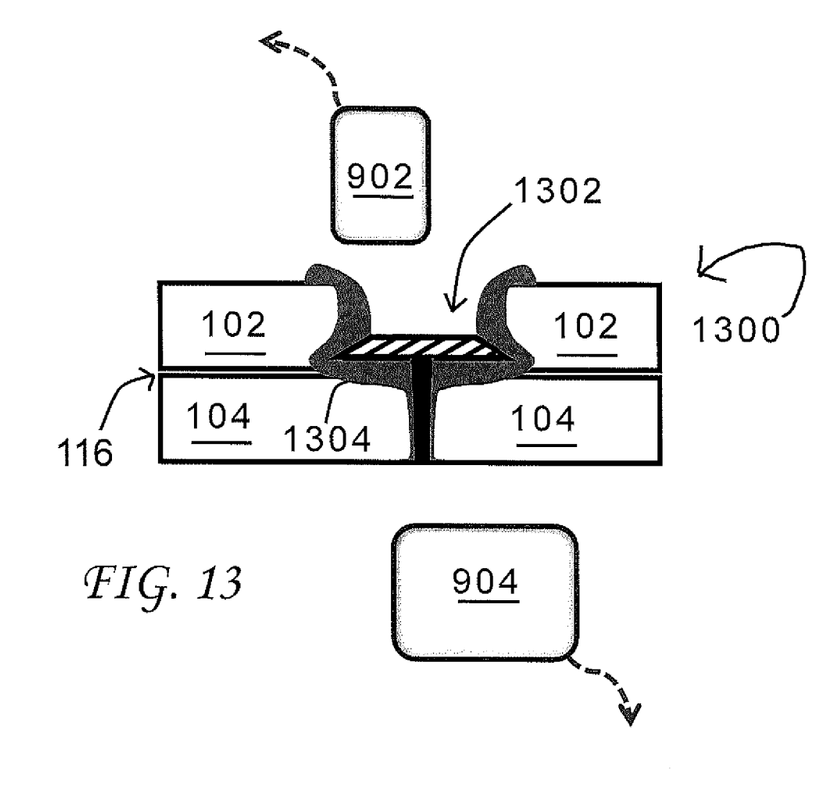
FIG. 13 shows the electrodes being withdrawn from the repaired product, including the robust repaired weld.

FIG. 13 shows the resulting repaired product 1300, including a repaired weld 1302, and the custom weld-repair tool 500 being withdrawn therefrom. As this is happening, and once application of the electrical current applied in connection with FIGS. 10-12, the product 1300, and especially the new, repaired, weld begins to cool and harden, solidifying the repaired weld 1302.

The resulting weld 1302 (FIG. 13), being a repaired version of the discrepant weld 300 (FIG. 3), matches the example initially-robust weld 400 (FIG. 4) better than does the discrepant weld 300 (FIG. 3).

The repaired weld 1302 can have even better characteristics than the example initially-robust weld 400.

The mechanical intermediary 500, now a part of the repaired joint 1302, also acts as a peel stopper after the joining process, as mentioned. More particularly, the intermediary 500 provides, during use of the resulting product, an extra layer of protection against either of the workpieces 102, 104 moving (e.g., peeling) away from the other of the workpieces.

III. Various Technology Features

Many but not all of the advantage of the present technology are outlined above. Some but not all are described in this summary.

Benefits of the present technology include saving material and cost associated with other conventional efforts to address situations in which a faulty weld is formed.

Cycle time and processing cost (electricity, robotic operations, etc.) are reduced, for instance, as time is not needed to determine how many new welds to create, and where, and to create such welds.

Cycle time and processing cost (electricity, robotic operations, etc.) can also be improved by avoiding scrapping of flawed products.

Recycling some workpieces is possible, but, resources would need to be dedicated to determining whether parts can be recycled, recycling the parts that can be, and handling the parts that cannot.

As another benefit, the resulting product is more robust, having a stronger joint between the workpieces.

The new joint, including the mechanical intermediary, also has the improved peel-stopping functions referenced above.

The benefits make welding in an assembling environment much more cost effective and results in lightweight, durable (e.g., corrosion-resistant), products—e.g., vehicle components and entire vehicle—having strong, robust, joints.

IV. Conclusion

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A method, for repairing a discrepant weld in a workpiece arrangement including at least two workpieces, comprising:
    positioning a composite mechanical intermediary adjacent the discrepant weld;
    inserting, following the positioning, the mechanical intermediary through the discrepant weld and into at least a distal workpiece of the two workpieces, wherein upon insertion, a proximate surface of the mechanical intermediary is exposed at a proximate side of the workpiece arrangement;
    delivering weld energy to the mechanical intermediary, wherein:
        the mechanical intermediary is configured, and the weld energy provided, so that the weld energy passes through the mechanical intermediary in a pre-determined manner;
        the weld energy passing through the mechanical intermediary in the pre-determined manner generates heat in material of at least one of the workpieces of the arrangement adjacent the mechanical intermediary;
        the heat generated causes the material to melt; and
        the material melts at a portion of the arrangement including an interface between the workpieces,
    wherein the composite mechanical intermediary includes conductive tool material and insulative tool material arranged so that the welding energy passing through the mechanical intermediary passes selectively through the conductive tool material and not through the insulative tool material, for directing, in a prescribed manner, workpiece melting resulting from the welding energy; and
    allowing or causing the material melted to cool, wherein the melted material, when cooled, forms or strengthens a robust joint connecting the workpieces.

2. The method of claim 1, wherein:
the mechanical intermediary includes a head;
the mechanical intermediary includes a distal protrusion extending from the head and including a distal surface;
the head includes a proximate exposed portion following the inserting;
the head includes the conductive tool material surrounding the insulative tool material; and
the distal protrusion includes the conductive tool material.

3. The method of claim 2, wherein the distal protrusion includes the insulative tool material surrounded by the conductive tool material of the distal protrusion.

4. The method of claim 1, wherein the delivering includes positioning a weld-energy applicator adjacent the exposed proximate surface of the mechanical intermediary and passing the energy through the applicator and to mechanical intermediary via the proximate surface.

5. The method of claim 4, wherein inserting the mechanical intermediary into the discrepant weld and at least the distal workpiece is further performed so that a distal surface of the mechanical intermediary is exposed at a distal side of the workpiece arrangement.

6. The method of claim 1, wherein at least one operation of the process is performed by automated machinery.

7. The method of claim 1, wherein the first workpiece and the second workpiece have identical material.

8. The method of claim 1, wherein the first workpiece and the second workpiece have dissimilar material.

9. The method of claim 1, wherein at least one of the workpieces includes polymer.

10. The method of claim 1, wherein:
the mechanical intermediary is a first mechanical intermediary of multiple distinct mechanical intermediaries having distinct characteristics from each other; and
the method further comprises:
    determining a form of the discrepant weld; and
    selecting, based on the weld form determined and the distinct characteristics, prior to the positioning, the first mechanical intermediary for use in repairing the discrepant weld.

11. The method of claim 1, wherein:
the method further comprises identifying that an initial weld is discrepant; and
the positioning, inserting, delivering, and cooling are performed in response to identification of the initial weld as discrepant.

* * * * *